United States Patent [19]
Koh et al.

[11] Patent Number: 5,936,793
[45] Date of Patent: Aug. 10, 1999

[54] CAPSTAN MOTOR FOR A MAGNETIC RECORDING AND REPRODUCING APPARATUS

[75] Inventors: Pohyoung Koh, Kyungki-Do; Eung Bok Kim, Seoul, both of Rep. of Korea

[73] Assignee: LG Electronics Inc., Seoul, Rep. of Korea

[21] Appl. No.: 08/634,559

[22] Filed: Apr. 18, 1996

[30] Foreign Application Priority Data

Apr. 18, 1995 [KR] Rep. of Korea .......................... 95/7847

[51] Int. Cl.⁶ .................................................. G11B 5/027
[52] U.S. Cl. .......................................................... 360/85
[58] Field of Search ............. 360/85, 95, 130.2–130.23, 360/130.3–130.32

[56] References Cited

U.S. PATENT DOCUMENTS

| | | | |
|---|---|---|---|
| 4,685,008 | 8/1987 | Ohyama | 360/85 |
| 4,949,203 | 8/1990 | Kunimaru et al. | 360/85 |
| 4,984,105 | 1/1991 | Hwang | 360/85 |
| 5,021,900 | 6/1991 | Yamashita et al. | 360/85 |
| 5,253,132 | 10/1993 | Gause et al. | 360/85 |

*Primary Examiner*—Allen T. Cao

[57] ABSTRACT

A capstan motor used in a magnetic recording and reproducing apparatus includes a rotatable rotor section provided with a capstan shaft, a stator section rotatably supporting the capstan shaft opposite to the rotor section, and a guide section formed at one side of the stator section for guiding the movement of a tape draw-out section for leading a tape to wind around the outer circumference of a head drum. Here, the structure of the a bearing holder and a base plate of the stator section has several functions simultaneously for decreasing the product size and the number of elements to contribute to miniaturization of a deck and enhance productivity of manufacturing the product.

12 Claims, 8 Drawing Sheets

CAPSTAN MOTOR FOR A MAGNETIC RECORDING AND REPRODUCING APPARATUS

BACKGROUND OF THE INVENTION

1. Field of the Invention

The present invention relates to a capstan motor, and more particularly to a capstan motor for a magnetic recording and reproducing apparatus, which is provided with a guide portion for guiding and installing other elements on a deck is formed to a bearing holder and a base plate of a stator section for minimizing the deck and improving workability of deck assembly.

2. Description of the Prior Art

In a deck mechanism of a general magnetic recording and reproducing apparatus, as shown in FIG. 1, loading paths 2 and 3 are formed to both sides of a head drum 1, and slant post bases 8 and 9 provided with supply and take-up side slant posts 4 and 5 and guide rollers 6 and 7 are installed to be movable along the loading paths 2 and 3 by means of a separate driving force.

A plurality of guide posts 10A, 10B, 10C and 10D, a tension post 11, a fullwidth erase head 12, an audio/control head 13, a pinch roller 14 and a capstan shaft 15 are installed onto the deck to constitute a travelling system of a tape T.

In the deck mechanism of the above-stated magnetic recording and reproducing apparatus, once a loading signal of tape T is supplied, the slant posts 4 and 5 and guide rollers 6 and 7 of the supply and take-up side slant post bases 8 and 9 draw the tape T to move along loading the paths 2 and 3 to force tape T to wind around the outer circumference of the head drum 1 by as much as approximately 180°. At the same time, the tension post 11 and pinch roller 14 become in contact with the tape T by a predetermined pressure. Under this state, tape T advances forward or backward direction in accordance with the rotational direction of the capstan shaft 15.

Here, the structure of a capstan motor M equipped with the capstan shaft 15 for providing a transferring force to tape T will be described in detail with reference to the accompanying drawings.

As shown in FIG. 2, capstan motor m of the general magnetic recording and reproducing apparatus is classified into a rotor section and a stator section.

In connection with the construction of the rotor section first, a permanent magnet 22 for forming a magnetic field required for the rotation of capstan motor m is adhesively fixed to the lower surface of a rotor case 21. A FG magnet-binding part 23 magnetized by a plurality of N and S polarities is adhesively fixed to the outer periphery of rotor case 21 for detecting a rotative speed. A pulley 24 is fixed to the bottom center of rotor case 21 to be integrally rotated for transferring a power which rotates a reel for supplying or taking up tape T within a tape cassette. Meantime, capstan shaft 15 contacting pinch roller 14 by the predetermined pressure is fixedly fitted into the center of pulley 24. Also, capstan shaft 15 is rotatably supported by a bearing 33 of the stator section which will be described as follows.

In considering the construction of the stator section, an armature winding 32 corresponding to permanent magnet 22 of the rotor section is adhesively fixed to the lower surface of a base plate 31. A bearing holder 34 installed with bearing 33 which rotatably supports capstan shaft 15 is fixed to the upper and lower sides of the center of base plate 31.

An MR device 35 for detecting the rotative speed of capstan motor m is installed to a predetermined portion of the bottom surface of base plate 31 opposite to FG magnet-binding part 23.

The capstan motor m of the general magnetic recording and reproducing apparatus constructed as above is assembled to be installed onto the deck as below. Referring to FIGS. 3 and 4, after a drum base 42 fixed with head drum 1 is fixed to a chassis 41, a loading base 43 formed with loading paths 2 and 3 is fixed to the lower side of drum base 42. Then, capstan motor m is fixed while capstan shaft 15 of capstan motor m projects via a fixing hole 41a in chassis 41, and head drum 1 is put on drum base 42 to be jointly fixed by a typical fixing unit.

On the other hand, one example of a take-up guide apparatus of the magnetic recording and reproducing apparatus applied with the general capstan motor will be described with reference to the drawings.

Referring to FIG. 5, when a loading gear 50 is rotated by the driving of a driving motor (not shown), a middle lever 51 is rotated about a shaft pin 52 counter-clockwise associative with the rotation of loading gear 50. Thus, a lock pin 51a of middle lever 51 pushes one side of a spring 53. By doing so, a pinch arm 54 installed with pinch roller 14 rotates clockwise by the elasticity of spring 53 to tightly press pinch roller 14 onto capstan shaft 15 by the predetermined pressure.

At this time, a lock pin 54a of pinch arm 54 pushes a spring 56 supporting a take-up guide 55 to the rear side, so that take-up guide 55 also rotates clockwise by the pressing force of spring 56, thereby drawing out the tape within the cassette.

A stopper pin 57 which allows take-up guide 55 to rotate until reaching a prescribed position during the clockwise rotation of take-up guide 55 is installed onto chassis 41. Consequently, the rotation of take-up guide 55 beyond the prescribed position is restricted by stopper pin 57.

However, in the above-described capstan motor of the general magnetic recording and reproducing apparatus, bearing holder 34 is fixed to base plate 31 to function for supporting the rotation of capstan shaft 15, and bearing holder 34 and loading base 43 are separately formed.

Therefore, in order to install separately-formed bearing holder 34 and loading base 43 onto chassis 41, a predetermined space on chassis 41 is needed for each element. That is, for installing loading base 43 and bearing holder 34 onto chassis 41 without causing interference against each other, respective elements require respective spaces occupying some area to inevitably make the overall size of the deck bulky which impedes miniaturization of the deck.

In addition, as shown in FIG. 5, the installation interval between stopper pin 57 and take-up guide 55 for the restriction upon the rotational operation of take-up guide 55 is so narrow that the operation of assembling take-up guide 55 to chassis 41 becomes intricate to degrade workability of the assembling operation.

SUMMARY OF THE INVENTION

Accordingly, it is an object of the present invention to provide a capstan motor of a magnetic recording and reproducing apparatus, wherein a bearing holder is formed to the right side of a take-up side loading path for, while performing a typical function of supporting a bearing, not only guiding the movement of a slant post base and blocking the rotation of a tape-leading guide member beyond a prescribed range thereof which draws out a tape, but also executing other functions of providing an assembling and coupling place of a housing and the like, thereby reducing the element size and decreasing the number of elements to contribute to the miniaturization of a deck and enhance productivity of a product.

According to one embodiment of the present invention, a capstan motor of a magnetic recording and reproducing apparatus includes a rotor section provided with a capstan shaft and being rotated, and a stator section rotatably supporting the capstan shaft and installed to be opposite to the rotor section. Furthermore, a guide section is formed to one side of the stator section for guiding the movement of a tape draw-out section which leads a tape to move toward a head drum to wind around the outer circumference of the head drum.

Preferably, the guide section is integrally formed by extending from a bearing holder fixed to a base plate side for supporting the capstan shaft to be freely rotated, or integrally formed by extending from one side of the base plate.

According to another embodiment of the present invention, the capstan motor of the magnetic recording and reproducing apparatus includes a rotor section provided with a capstan shaft and being rotated, and a stator section rotatably supporting the capstan shaft and installed to be opposite to the rotor section. Furthermore, a stopper section is formed to one side of the stator section for inhibiting the movement of a tape guide member for drawing out and guiding a tape.

Preferably, the stopper section is formed to a bearing holder fixed to a base plate side for supporting the capstan shaft to be freely rotated.

According to still another embodiment of the present invention, the capstan motor of the magnetic recording and reproducing apparatus includes a rotor section provided with a capstan shaft and being rotated, and a stator section rotatably supporting the capstan shaft and installed to be opposite to the rotor section. Furthermore, a coupling guide section is integrally formed to one side of the stator section for insertedly receiving to guide a guide section formed to one end of a housing which forces a cassette tape to move to a recordable/reproducible place.

Preferably, the coupling guide section is formed to a bearing holder fixed to a base plate side for supporting the capstan shaft to be freely rotated.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Hereinafter, a capstan motor of a magnetic recording and reproducing apparatus according to the present invention will be described with reference to the preferred embodiments shown in the accompanying drawings.

Figure 1:
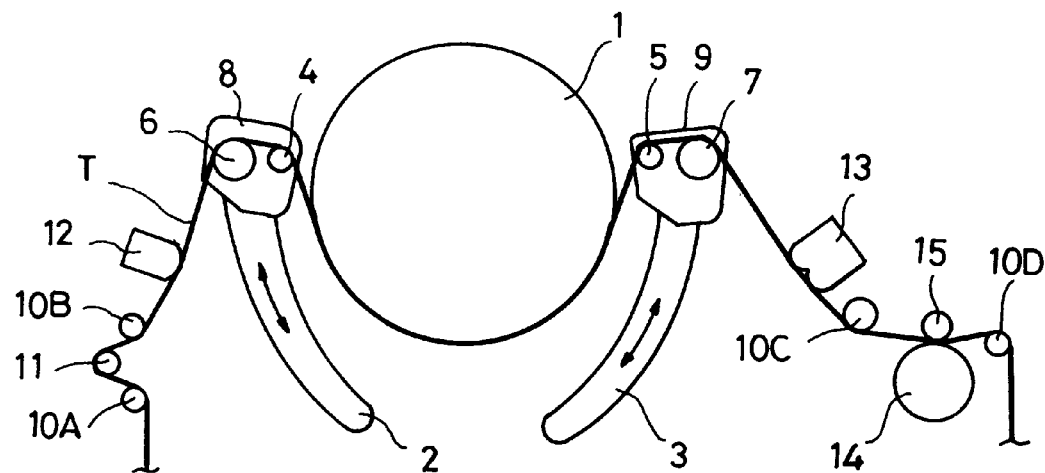
FIG. 1 is a plan view showing a tape travelling path along which a tape travels in a general magnetic recording and reproducing apparatus.
Figure 2:
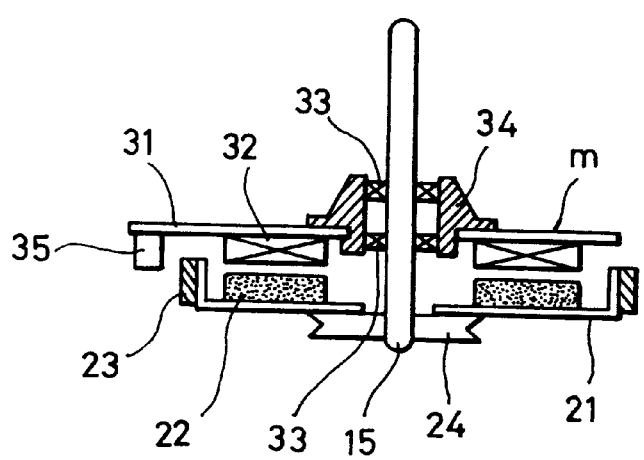
FIG. 2 is a vertical section view showing a structure of a capstan motor employed in the general magnetic recording and reproducing apparatus.
Figure 3:
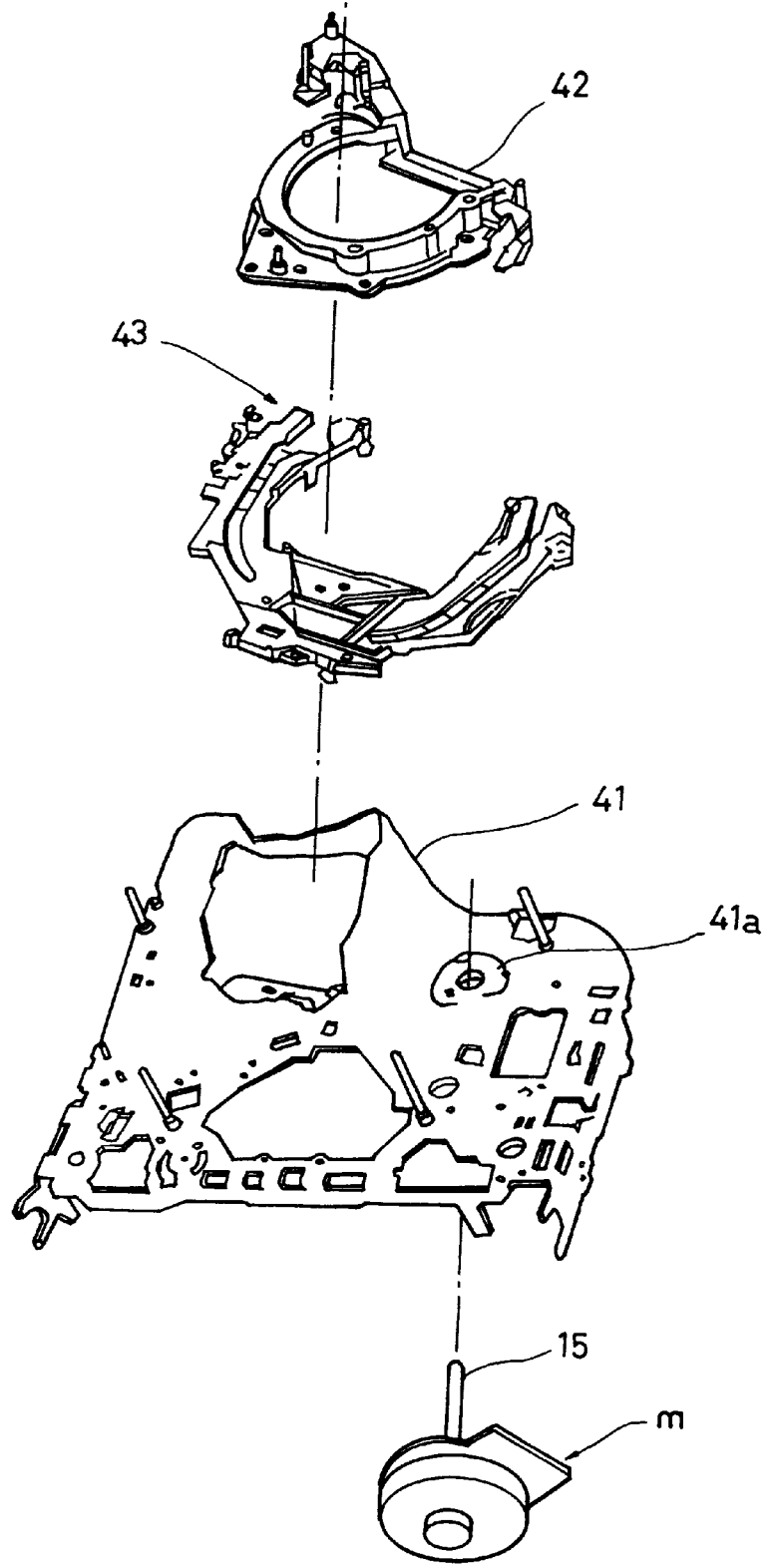
FIG. 3 is an exploded perspective view for illustrating the assembling of a drum base, a head base and the capstan motor to a chassis of the general magnetic recording and reproducing apparatus.
Figure 4:
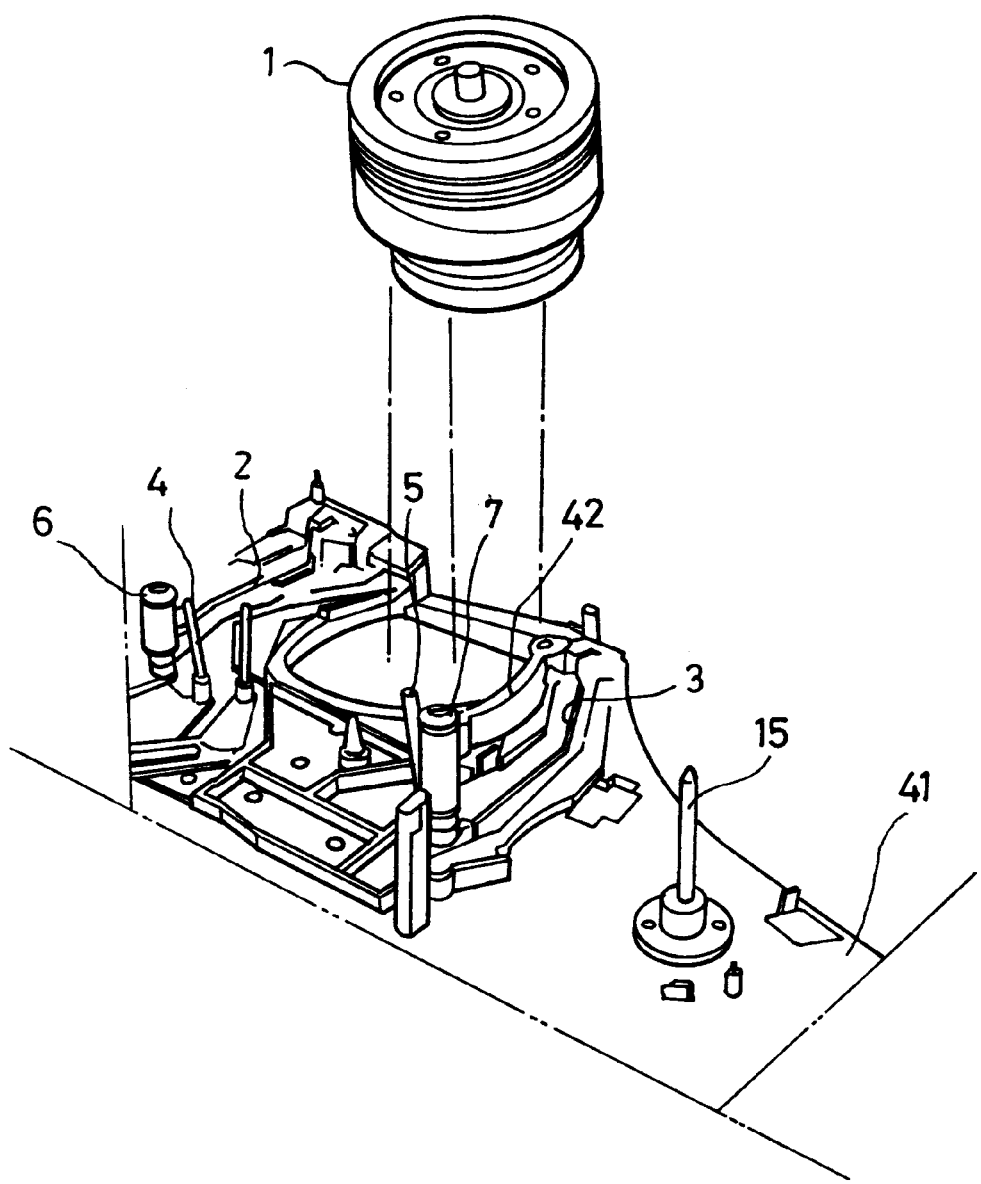
FIG. 4 is an exploded perspective view for illustrating the assembling of the head drum to the chassis of the general magnetic recording and reproducing apparatus.
Figure 5:
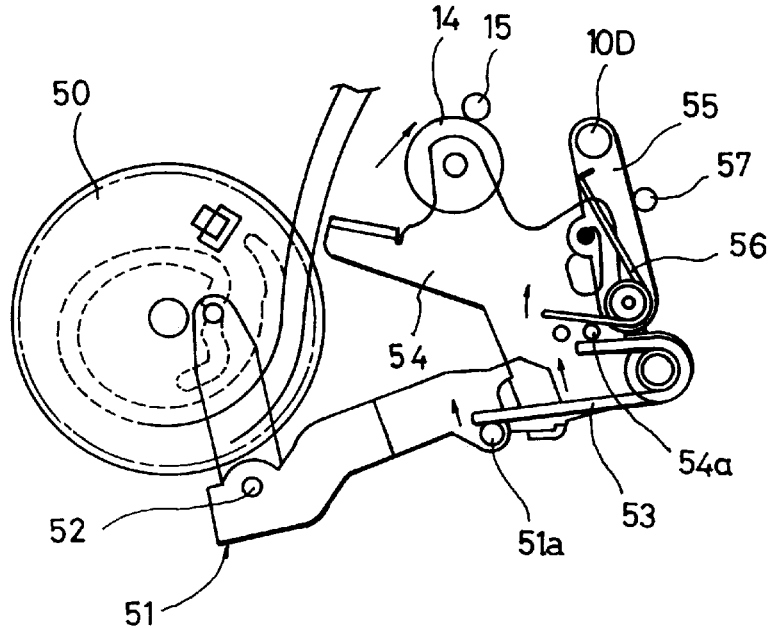
FIG. 5 is a plan view showing one example of a take-up guide apparatus employing the capstan motor of the general magnetic recording and reproducing apparatus.
Figure 6:
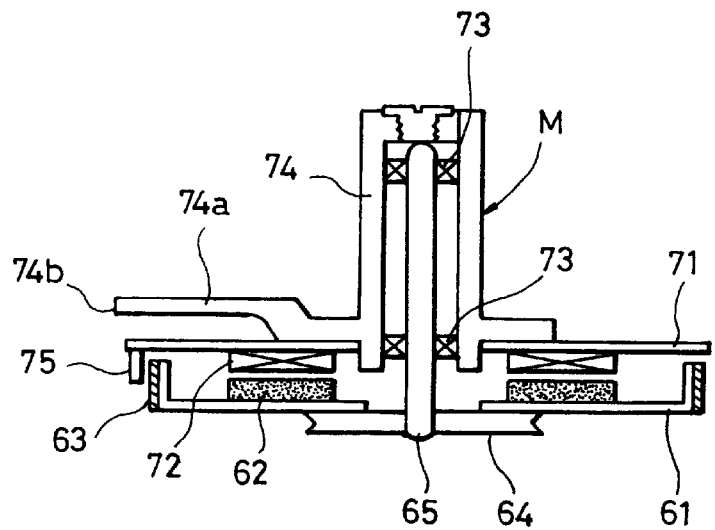
FIG. 6 is a vertical section view showing a construction of a first embodiment of a capstan motor according to the present invention.
Figure 7:
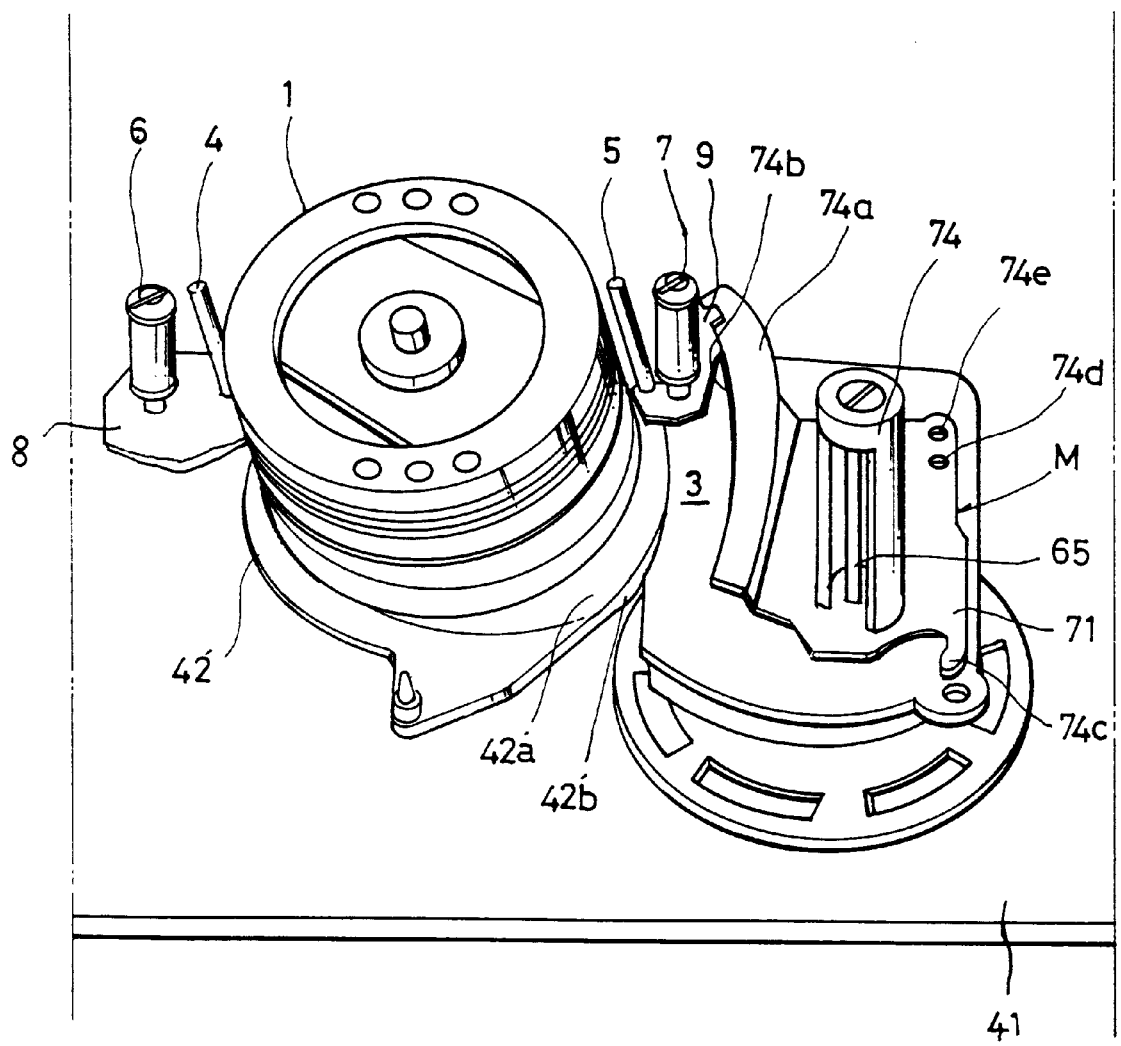
FIG. 7 is a perspective view showing the major portion under the state that the capstan motor according to the present invention shown in FIG. 6 is applied to a magnetic recording and reproducing apparatus.

Referring to FIGS. 6 and 7, a construction of a first embodiment of the present invention will be described.

As illustrated, a capstan motor M according to the present invention is largely classified into a rotor section and a stator section, and includes an extension part 74a integrally extending from a bearing holder 74 of the stator section in a body.

A permanent magnet 62 for forming a magnetic field required for the rotation of a capstan shaft 65 is adhesively fixed to the bottom surface of a rotor case 61. A FG magnet-binding part 63 magnetized to a plurality of N and S polarities for detecting a rotative speed is adhesively fixed to the outer periphery of rotor case 61. A pulley 64 which transmits a power supplied for rotating reels onto a deck is fixed to the bottom center of rotor case 61 to be rotated together with rotor case 61. One end of capstan shaft 65 is fixedly fitted into pulley 64 to be able to rotate with rotor case 61 and pulley 64 altogether. Also, capstan shaft 65 is rotatably supported by a bearing 73 of the stator section which will be described later.

The stator section is adhesively fixed with an armature winding 72 to the bottom surface of a base plate 71 to correspond to permanent magnet 62 of the rotor section. A bearing holder 74 installed with bearing 73 for supporting the rotational operation of capstan shaft 65 is fixed to the upper and lower sides of the inner center of base plate 71.

An MR device 75 installed to be opposite to FG magnet-binding part 63 of the rotor section is fixed to a predetermined bottom portion of base plate 71 for detecting the rotative speed of the rotor section.

Extension part 74a extending from bearing holder 74 in a body extends toward a head drum 1 on a chassis, so that a preceding end 74b thereof forms one side of loading path 3 which guides take-up side slant post base 9.

Preceding edge 74b of extension part 74a extending toward head drum 1 is formed to have a predetermined curvature to form loading path 3, thereby guiding slant post base 9.

Meantime, an extension 42'a is formed to the take-up side of a drum base 42' for fixing head drum 1 thereto, and edge plane 42'b provided to the outer side of extension 42'a is formed in a predetermined curvature to form one side of loading path 3. Therefore, edge plane 42'b of extension 42'a formed to drum base 42' and preceding edge 74b of extension part 74a form loading path 3, thereby guiding the movement of take-up side slant post base 9.

In this embodiment, a stopper part 74c is provided to one portion of the stator section, e.g., a predetermined portion of bearing holder 74. Stopper part 74c serves for inhibiting the rotation beyond a prescribed range of a take-up guide 55 which draws out to guide a tape T toward capstan shaft 65. In other words, the rotation of take-up guide 55 beyond the prescribed range is obstructed to allow guide post 10D provided to take-up guide 55 to be positioned for properly guiding tape T having passed between pinch roller 14 and capstan shaft 65.

Figure 8:
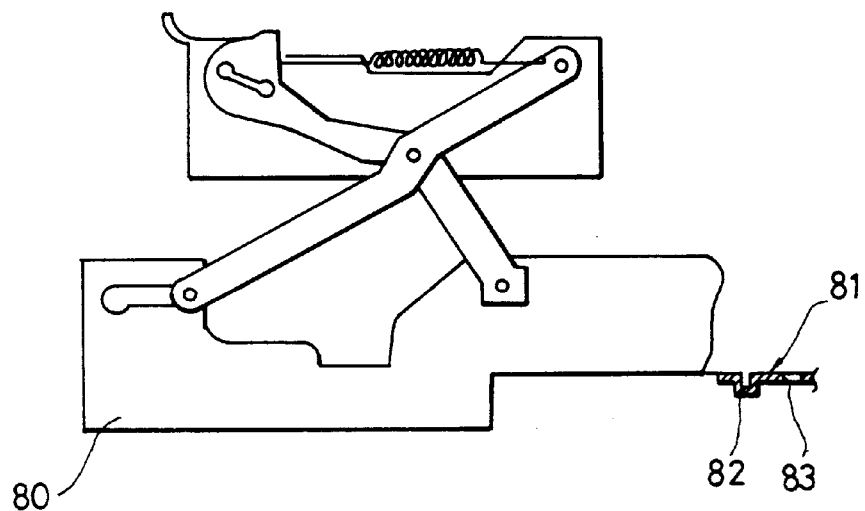
FIG. 8 is a side section view, with portions cut away, of a housing fixing structure to which the capstan motor according to the present invention is applied.
Figure 10:
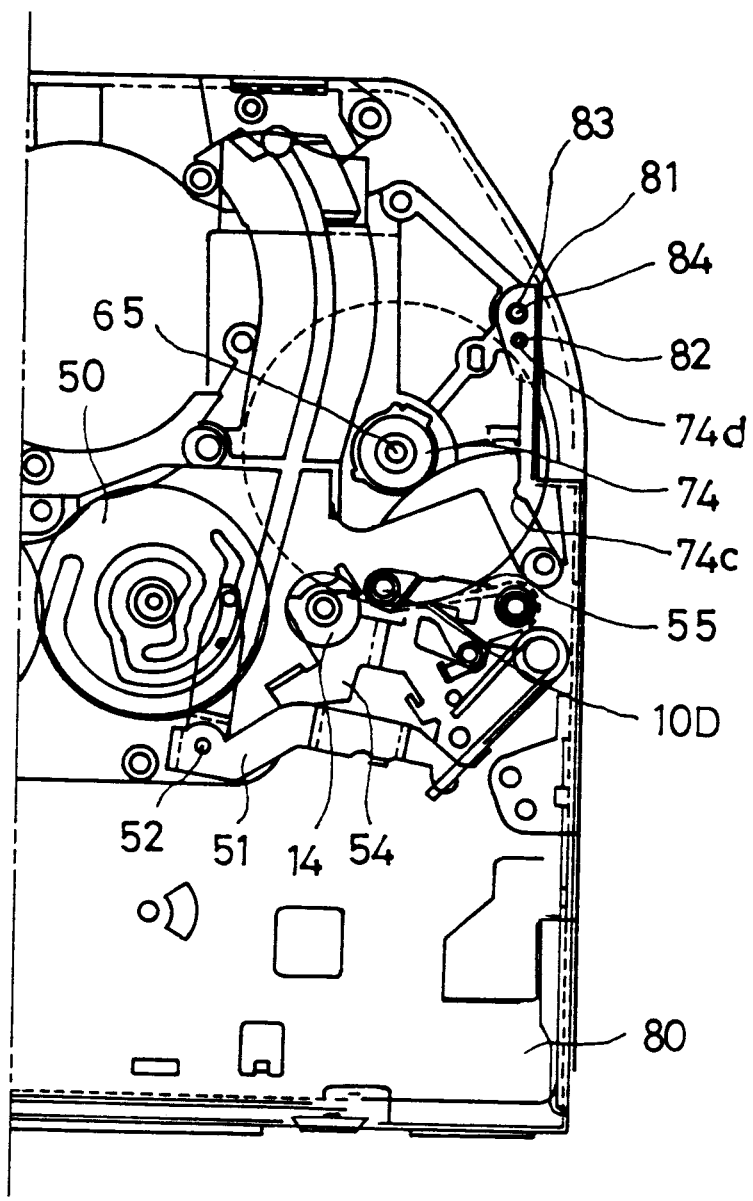
FIG. 10 is a plan view showing the take-up guide apparatus on the deck which employs the capstan motor according to the present invention under a state prior to being operated.
Figure 11:
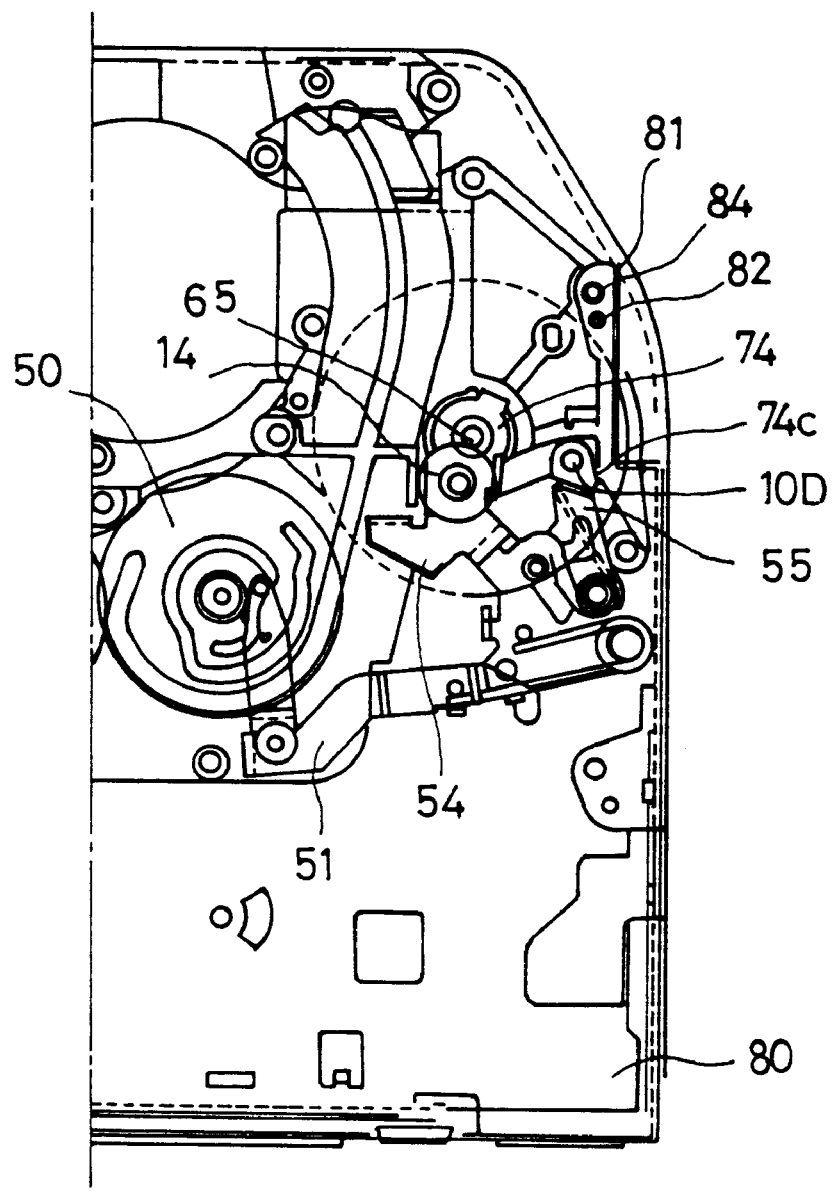
FIG. 11 is a plan view of the take-up guide apparatus on the deck which employs the capstan motor according to the present invention under operation.

On the other hand, a guide hole 74d and a screw insertion hole 74e are perforated in one side of bearing holder 74 of the stator section for guiding to couple a guide part 81 (refer to FIG. 8) formed to one end of cassette housing 80 which transfers the cassette tape to a recordable/reproducible place. As shown in FIGS. 10 and 11, guide hole 74d is insertedly installed with a guide lug 82 of guide part 81, and respective screw insertion holes 74e and 83 are fitted by means of a fixing screw 84 to fix cassette housing 80.

Here, the elements identical to those of the conventional construction are represented by the same reference numerals to be described.

In the deck mechanism of the magnetic recording and reproducing apparatus applied with the capstan motor according to the first embodiment of the present invention as described above, once a tape loading signal is supplied while the cassette is seated, slant posts 4 and 5 of supply and take-up side slant post bases 8 and 9 lead tape T to be moved along loading paths 2 and 3. When the movement of slant post bases 8 and 9 are completed, tape T winds around the outer circumference of head drum 1 as much as a predetermined angle (approximately 180°). At this time, take-up side slant post base 9 is moved while being guided along load path 3 formed by edge plane 42'b of drum base 42 and preceding edge 74b of extension part 74a of bearing holder 74.

Referring to FIGS. 10 and 11, an operation of take-up guide 55 will be described.

Under the state illustrated in FIG. 10, the drawing-out operation of tape T by take-up guide 55 is identical to that of the conventional one. That is, pinch roller 14 and guide post 10D are placed within the tape cassette seated on the deck for drawing out tape T from the tape cassette to lead tape T to the tape travelling system. When loading gear 50 is rotated under this state to start the loading operation, slant post bases 8 and 9 draw out tape T to move along loading paths 2 and 3. Also, pinch arm 54 and take-up guide 55 are rotated clockwise by being interlocked with middle lever 51 driven by loading gear 50. The state of finishing the tape drawing-out operation as above is illustrated in FIG. 11. In more detail, pinch roller 14 closely contacts capstan shaft 65 by interposing tape T while applying the prescribed pressure, and one side of take-up guide 55 is in contact with stopper part 74c of bearing holder 74, so that further clockwise rotation is inhibited to be stopped at the proper location. Under this circumstance, the forward and backward travelling of the tape is carried out in accordance with the operational mode.

Figure 9:
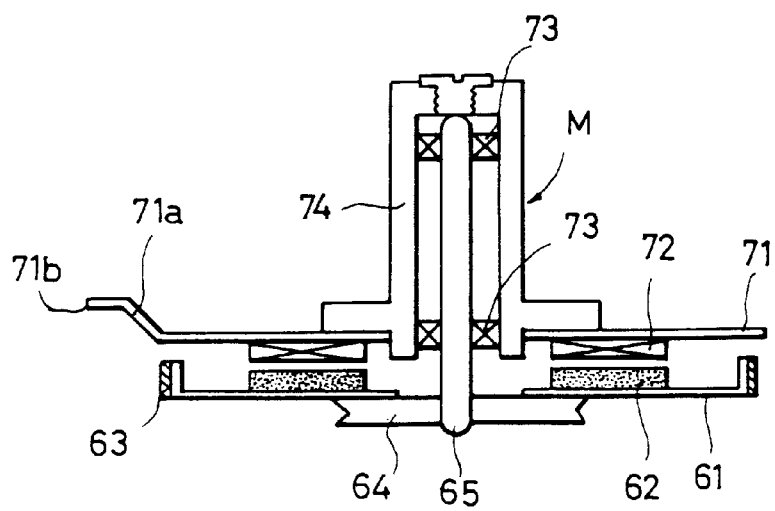
FIG. 9 is a vertical section view showing a construction of a second embodiment of the capstan motor according to the present invention.

On the other hand, a second embodiment of the capstan motor according to the present invention will be described with reference to FIG. 9. In this embodiment, the elements integrally formed to the bearing holder in the first embodiment are formed to the base plate in a body.

In other words, one side of base plate 71 of the stator section installed to correspond to the rotor section extends toward head drum 1 to provide an extension part 71a. A preceding plane 71b of extension part 71a have a predetermined curvature to form a loading path with edge plane 42b of extension part 42'a formed to drum base 42'. Along the loading path formed as above, the take-up side slant post base is guided to be moved as mentioned above.

As is not illustrated, stopper part 74c, guide hole 74d and screw insertion hole 74e provided to bearing holder 74 of the first embodiment may be formed to base plate 71. The shapes of elements formed to base plate 71 are similar to those of the first embodiment, the description will thus not be repeated.

In the capstan motor according to the present invention as described above, the bearing holder according to the present invention performs the typical function of supporting the bearing and simultaneously forms one side of the take-up side loading path to guide the movement of the slant post base while combined function is conducted by providing the assembly coupling place of the housing and functioning as the stopper for inhibiting further rotation of the take-up guide at the prescribed location. Thus, the space required on the chassis is reduced to attain the miniaturization of the deck over the technique of installing respective elements performing respective functions on the chassis.

Furthermore, since the bearing holder or base plate serves several functions as described above, the number of elements constituting the deck is decreased. Consequently, the workability of the assembly process is enhanced to improve productivity and be cost effective.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. In a magnetic recording and reproducing apparatus including a movable tape draw-out mechanism, a capstan motor comprising:

a rotatable rotor section provided with a capstan shaft extending therefrom;

a stator section opposite said rotor section, said capstan shaft being rotatably mounted on said stator section, whereby said rotor section is rotatable relative to said stator section; and a guide surface provided on a side of said stator section and defining one side of a loading path for guiding movement of the tape draw-out mechanism therealong.

2. A capstan motor for a magnetic recording and reproducing apparatus as claimed in claim 1, wherein said stator section comprises a base plate having a bearing holder mounted thereon, said bearing holder rotatably supporting said capstan shaft, wherein said guide surface is provided on said bearing holder.

3. A capstan motor for a magnetic recording and reproducing apparatus as claimed in claim 1, wherein said stator section comprises a base plate having a bearing holder mounted thereon, wherein said guide surface is provided on said base plate.

4. A capstan motor for a magnetic recording and reproducing apparatus as claimed in claim 1, wherein the magnetic recording and reproducing apparatus includes a head drum mounted on a drum base, wherein said bearing holder includes an extension part extending therefrom towards the head drum, said guide surface being provided on a leading edge of said extension part.

5. In a magnetic recording and reproducing apparatus utilizing magnetic tape in a cassette as a recording medium, a capstan motor comprising:

a rotor section provided with a capstan shaft;

a stator section provided opposite said rotor section and rotatably supporting said capstan shaft; and a coupling guide integrally formed on a side of said stator section constructed and arranged to couple with a guide section of the cassette housing.

6. A capstan motor for a magnetic recording and reproducing apparatus as claimed in claim 5, wherein said stator section comprises a base plate having a bearing holder mounted thereon, said bearing holder rotatably supporting said capstan shaft, said coupling guide is integral with said bearing holder.

7. In a magnetic tape recording and reproducing apparatus having a head drum and a movable tape take-up slant post base for drawing a magnetic tape about the head drum, a capstan motor comprising:

a rotor section comprising a rotor case mounted on a capstan shaft; and a stator section comprising a bearing holder constructed and arranged to rotatably support said capstan shaft, said stator section being provided with an extension portion, said extension portion including a guide surface arranged to guide movement of the tape take-up slant post base.

8. The capstan motor as claimed in claim 7, wherein said stator section comprises a base plate onto which an armature winding is affixed.

9. The capstan motor as claimed in claim 8, wherein said rotor case includes a magnetic member mounted thereon so as to oppose said armature winding.

10. The capstan motor as claimed in claim 9, wherein said rotor section includes a pulley mounted on said capstan shaft on an opposite side of said rotor case from said bearing holder.

11. The capstan motor as claimed in claim 7, wherein said extension portion extends from said bearing holder.

12. The capstan motor as claimed in claim 8, wherein said extension portion extends from said base plate.

* * * * *